Nov. 22, 1966  T. D. H. ANDREWS ETAL  3,286,643
GEAR PUMPS AND MOTORS
Filed Oct. 5, 1964
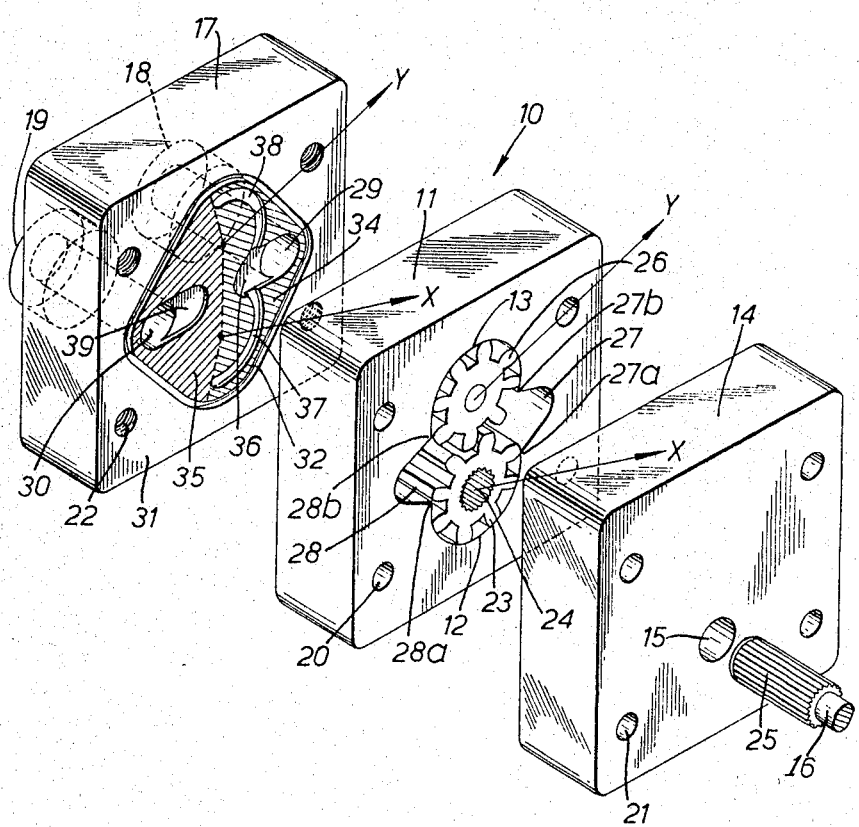
INVENTORS
THOMAS D. H. ANDREWS
BY JOHN C. E. FLINT
Reynolds + Christensen
ATTORNEYS United States Patent Office 3,286,643
Patented Nov. 22, 1966

3,286,643
GEAR PUMPS AND MOTORS
Thomas D. H. Andrews, Leckhampton Hill, Cheltenham, and John C. E. Flint, Chalford, England, assignors to Dowty Technical Developments Limited, Cheltenham, England, a British company
Filed Oct. 5, 1964, Ser. No. 401,597
Claims priority, application Great Britain, Oct. 14, 1963, 40,357/63
8 Claims. (Cl. 103—126)

This invention relates to hydraulic machines and more particularly to gear pumps and motors.

According to this invention, an hydraulic machine in the form of a gear pump or gear motor comprises a casing having inlet and outlet ports and a number of intermeshing gears, one or more of which are without a bearing shaft, the tips of the teeth of each of such one or more gears bearing for rotation of the gear upon the wall of a respective cylinder formed in the casing in overlapping relationship with its adjacent cylinder, a groove being formed in a wall of the cylinder of each such gear, extending from the inlet port in the case of a pump or from the outlet port in the case of a motor, part-way around the cylinder, thereby to place the spaces between the gear teeth in communication with that port as they pass the groove, to relieve the tooth pressure around part of the gear and thus to produce a resultant thrust in a direction which affords bearing of the gear against an adequate part of the casing.

Each groove may extend part-way around the circumferential edge portion of a circular end wall of the respective cylinder.

Where the hydraulic machine comprises two gear wheels both of which are without a bearing shaft two such grooves are provided respectively in a circular end wall of both cylinders, both grooves communicating with the inlet port in the case of a pump or the outlet port in the case of a motor through a recess formed in and common to both end walls.

The extent of the grooves around the respective circular end walls may be in the range of approximately 180 degrees to 270 degrees.

That gear which constitutes the driver gear in the case of a pump and the output gear in the case of a motor may be connected to a drive shaft in a manner such that the shaft is not supported primarily by a bearing in the casing, but that gear itself forms at least part of the bearing support for the shaft, as its teeth bear upon the cylindrical wall of its casing.

One embodiment of the invention will now be particularly described by way of example with reference to the accompanying drawing which is a perspective view of an hydraulic machine, in the form of a gear pump that has but two gears, in dis-assembled condition.

Referring to the drawing, the casing 10 of a gear pump comprises a main central portion 11 having two cylinders 12 and 13 formed therein in parallel but overlapping relation, a cover portion 14 having an aperture 15 through which a drive shaft 16 is insertable, but in which it does not bear primarily, and a head portion 17 which incorporates an inlet port connection 18 and an outlet port connection 19.

The main portion 11 and the cover portion 14 are each provided with four bolt holes 20 and 21 respectively through which, for assembly of the pump, set bolts (not shown) are passed for engagement in tapped holes 22 formed in the head portion 17. The cylinder 12 houses a driver gear 23 having a splined bore 24. The shaft 16 has an externally splined end portion 25 which, after passing through the aperture 15 in the assembled pump, engages the splined bore 24.

The driver gear 23 meshes with an idler gear 26 housed for rotation in the other cylinder 13. Both the driver gear 23 and the idler gear 26 are shaftless, but for rotation thereof the tips of the teeth of the gears bear upon the circumferential wall of their respective cylinder. It is this bearing of the teeth of gear 23 that constitutes the primary bearing for shaft 16.

At the position where the two cylinders 12 and 13 overlap, the main portion 11 of the casing is opened out transversely thereof on either side to form an inlet zone 27 on one side of the gears and an outlet zone 28 on the other side of the gears. The inlet zone 27 is in axial registry with an inlet port 29 provided in the head portion 17 and which is in communication with the inlet port connection 18. The outlet zone 28 is in axial registry with an outlet port 30 also formed in the head portion 17 and which is in communication with the outlet port connection 19.

The shape of the inlet zone 27 is such as to provide two parallel nose portions 27a and 27b, while the shape of the outlet zone 28 is also such as to provide two parallel nose portions 28a and 28b.

The face 31 of the head portion 17 which adjoins the main portion 11 is provided with a groove 32 which houses an endless sealing ring (not shown) of circular cross-section. The area of the portion of the face 31 enclosed by this sealing ring is divided approximately into a low pressure distribution area indicated by the cross-hatching 34 and a high pressure distribution area indicated by the cross-hatching 35.

Within the low pressure distribution area 34 the face 31 is provided with a recess 36 into which the port 29 opens.

The engagement of the face 31 with the main portion 11 of the casing is such that circular end walls are effectively formed at the end portions of the cylinders 12 and 13.

Two arcuate grooves 37 and 38 extend from the low pressure recess 36 part-way around the circumferential edge portion of the circular end walls of the cylinders 12 and 13, respectively. These grooves each extend through approximately 180 degrees.

A further recess 39, of similar shape to the recess 36, is provided within the high pressure distribution area 35 in the face 31, the outlet port 30 opening into this recess.

A further endless sealing ring (not shown) is provided in a groove, similar to the groove 32, cut in that face of the cover portion 14 in engagement with the main portion 11.

In operation of the pump, rotation of the drive shaft 16 by some external power source effects rotation of the driver gear 23, the bearing whereof in its cylinder 12 supports its shaft 16, and thus effects rotation of the idler gear 26. Accordingly, hydraulic fluid is drawn in through the inlet port connection 18 and inlet port 29 into the inlet zone 27, being pumped around the outsides of the gears 23 and 26 and being delivered under high pressure into the high pressure zone 28 and thence through the outlet port 30 and outlet port connection 19 to a service operated or lubricated thereby. During such operation the spaces between the gear teeth of both gears 23 and 26 when passing the respective grooves 37 and 38 are placed in communication with the inlet port 29 by way of the recess 36. In this way tooth pressure is relieved in a manner such that a resultant tooth bearing thrust is produced (in the planes of the respective gears) in a direction towards a part of the casing other than the two pairs of nose portions 27a, 27b, 28a, 28b, so that bearing of the gear against an adequate part of the peripheral wall of its cylinder is afforded. In the drawing the resultant tooth bearing thrust is indicated by the arrow X for the gear 23 and by the arrow Y for the gear 26.

Thus, by this construction, since no shaft or shaft bearing is required for the idler gear 26 and since no separate bearing, other than that afforded by its gear 23 in its cylinder 12, is required for the drive shaft 16, at least in the proximity of the pump, a cheapening in the pump construction is provided.

Such a gear pump may with advantage be employed as a make-up pump for a hydrostatic transmission.

The invention is in no way limited to gear pumps having two gears, as in other embodiments of the invention, gear pumps are provided with any required number of gears. Also, the invention is not limited to the application of tooth presure relief to both or all of the gears in a gear pump, since in cases where so desirable, one gear in the case of a two gear pump, or more than one in the case of a multi-gear pump may be provided with shafts and bearings therefor, in which case the respective gear or gears need not be provided with an arcuate pressure relieving groove.

Although in the embodiment described with reference to the drawing, the arcuate pressure relief grooves are provided around the edge portions of the two end walls of the cylinders, in alternative embodiments of the invention, these grooves are instead provided either in the circumferential walls of the cylinders, or, alternatively, partly in the circular end walls and partly in the circumferential walls.

Although in the embodiments described and referred to reference has been made to gear pumps, equally well within its scope, this invention is applicable to gear motors.

Again, in both gear pumps and gear motors, the invention is not limited to arcuate pressure relief grooves which extend through approximately 180 degrees, as in other embodiments of the invention such grooves extend through a different angle, say, up to about 270 degrees, in dependence upon the precise physical construction and capacity of the pump or motor.

We claim as our invention:

1. An hydraulic machine comprising a casing formed with two overlapping working cylinders, and including a low pressure port and a high pressure port, two intermeshing gears each of which is supported for rotation solely at the tips of its teeth in a respective working cylinder, one gear being directly connected to a drive shaft in such a manner that that gear itself forms the only means for rotatably supporting the shaft in the casing, annular grooves being formed in the wall of each cylinder extending from the low presure port part-way around the respective cylinder, and located to place the spaces between the gear teeth in communication with that port as they pass each groove, to relieve the tooth pressure around part of each gear and thus to produce resultant thrust so directed as to afford bearing of the gear primarily against an uninterrupted part of the cylinder's peripheral wall.

2. An hydraulic machine as claimed in claim 1, wherein each groove extends part-way around the circumferential edge portion of a circular end wall of its respective cylinder.

3. An hydraulic machine as claimed in claim 2, wherein the casing is formed with a recess opening to both end walls, and both grooves communicate with said recess.

4. An hydraulic machine as claimed in claim 2, wherein the extent of the grooves around the respective circular end walls is in the range of approximately 180 degrees to 270 degrees.

5. An hydraulic machine as claimed in claim 2, wherein the casing thereof comprises a main portion which houses the gears, a cover portion, and a head portion which incorporates the low pressure and high pressure ports, that face of the head portion which abuts the main portion incorporating sealing means which enclose an area upon the face, the cylinders in the main portion and parts of said area together defining said circular end walls.

6. An hydraulic machine as claimed in claim 1, wherein the drive shaft has an externally-splined portion which is arranged to fit in a correspondingly-internally-splined bore in the said one gear.

7. An hydraulic machine as claimed in claim 1, wherein the low pressure port has a connection for receiving hydraulic fluid from a reservoir, and the drive shaft is connectible to an external power source for mechanical driving of the two gears, the high pressure port being connectible to a service so that upon rotation of the gears, high pressure hydraulic fluid is delivered for operation of that service.

8. An hydraulic machine as claimed in claim 1, wherein the high pressure port is arranged to receive hydraulic fluid under pressure from a pressure source for hydraulic driving of the two gears, hydraulic fluid then exhausting from the outlet side of the gears passing into the low pressure port which is connectible to a reservoir, one of the gears being mechanically connectible to a rotatable device thereby powered by the machine.

References Cited by the Examiner

UNITED STATES PATENTS

| | | | |
|---|---|---|---|
| 2,049,797 | 8/1936 | Bochmann et al. | 103—126 |
| 2,424,750 | 7/1947 | Heckert | 103—126 |
| 2,619,040 | 11/1952 | Maisch | 103—126 |
| 2,880,678 | 4/1959 | Hoffer | 103—126 |
| 2,923,249 | 2/1960 | Lorenz | 103—126 |
| 2,993,450 | 7/1961 | Weigert | 103—126 |

FOREIGN PATENTS 305,522    5/1955    Switzerland.

MARK NEWMAN, *Primary Examiner.*

WILBUR J. GOODLIN, *Examiner.*